Sept. 28, 1965    H. A. CAMPBELL, JR., ET AL    3,208,687
TAKE-UP SPOOL AND TAPE CONNECTOR ASSEMBLY
FOR MAGNETIC TAPE RECORDERS
Filed Jan. 17, 1964
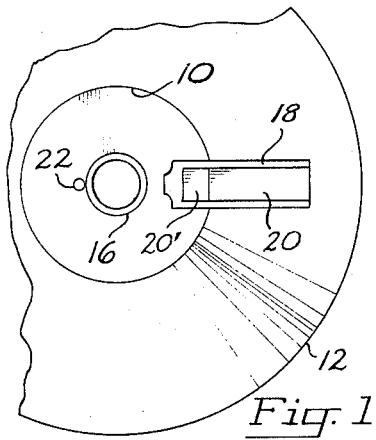
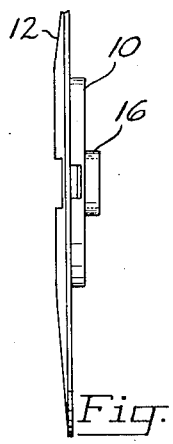
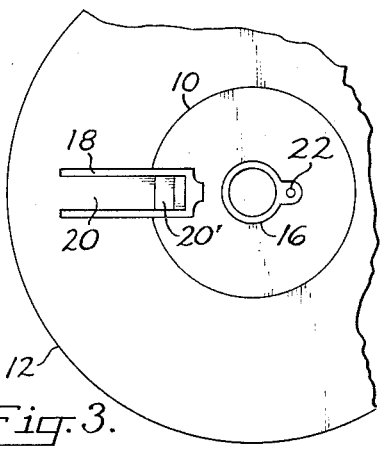
Fig. 1.    Fig. 2. Fig. 3.
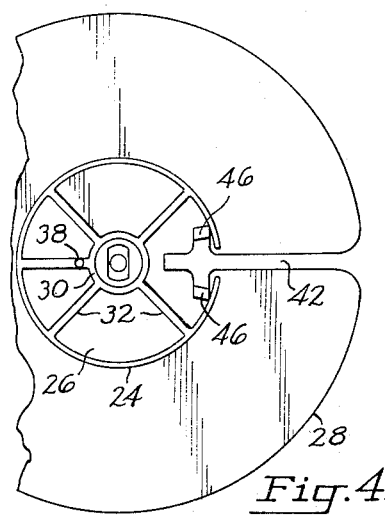
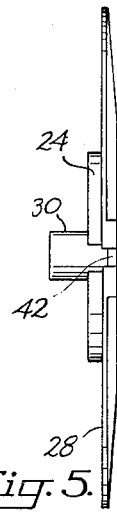
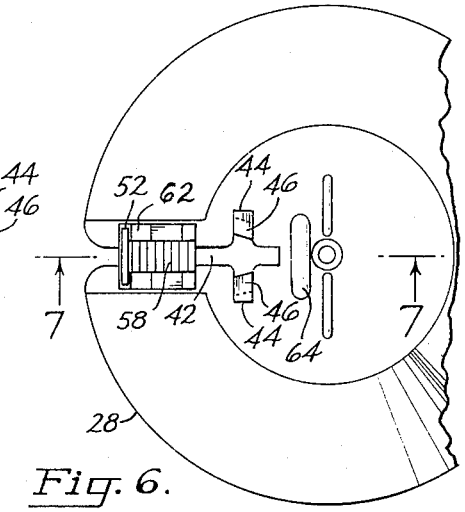
Fig. 4. Fig. 5.    Fig. 6.
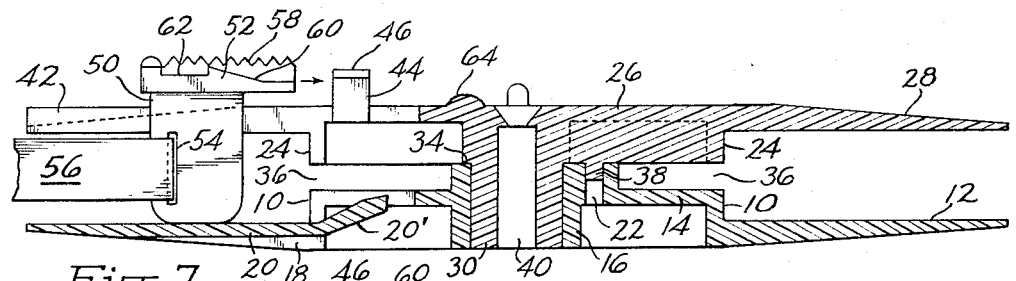
Fig. 7.
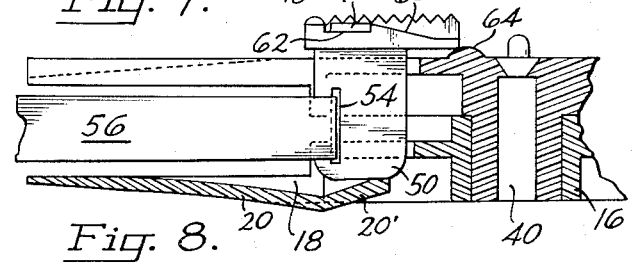
Fig. 8.
H Albert Campbell, Jr.
Harold R. Burt
INVENTORS
BY *Oliver D. Olson*
Agent

United States Patent Office 3,208,687
Patented Sept. 28, 1965

3,208,687
TAKE-UP SPOOL AND TAPE CONNECTOR ASSEMBLY FOR MAGNETIC TAPE RECORDERS
H Albert Campbell, Jr., Portland, and Harold R. Burt, Beaverton, Oreg., assignors, by mesne assignments, to K.W.F. Industries, Inc., a corporation of Washington
Filed Jan. 17, 1964, Ser. No. 338,347
5 Claims. (Cl. 242—74)

This invention relates to magnetic tape recorders, and more particularly to a novel take-up spool and connector assembly for use therewith.

This invention represents an improvement over the takeup spool and connector disclosed in our copending application Ser. No. 167,096 filed Jan. 19, 1962 and entitled Magnetic Tape Cartridge and Feed Assembly for Tape Recorders.

It is the principal object of the present invention to provide for tape recorders a take-up spool and connector assembly which affords positive and precise attachment and detachment of a magnetic tape with maximum speed and facility.

Another important object of this invention is the provision of a take-up spool and connector assembly of the class described which is of simplified construction for economical manufacture.

The foregoing and other objects and advantages of the present invention will appear from the following detailed description, taken in connection with the accompanying drawing in which:

FIG. 1 is a fragmentary plan view of the outer side of the inner section of a take-up spool embodying the features of this invention;

FIG. 2 is a fragmentary end elevation thereof as viewed from the right in FIG. 1;

FIG. 3 is a fragmentary plan view of the inner side of the inner spool section;

FIG. 4 is a fragmentary plan view of the inner side of the outer spool section;

FIG. 5 is an end elevation thereof as viewed from the right in FIG. 4;

FIG. 6 is a fragmentary plan view of the outer side of the outer spool section and showing mounted thereon the tape connector element of the assembly;

FIG. 7 is an enlarged fragmentary sectional view taken along the line 7—7 in FIG. 6 and showing the inner and outer spool sections in assembled condition and the tape connector in uncoupled position; and FIG. 8 is a fragmentary sectional view similar to FIG. 7 and showing the tape connector element in coupled position.

In its broad aspect the take-up spool and connector assembly comprises a pair of spool sections joined together to form a unitary spool, the spool including a resilient actuator engageable by a tape connector member to urge the latter to a position of engagement with latch means on the spool.

In the preferred embodiment illustrated, the take-up spool comprises two sections each, preferably formed as an integral unit by the well known technique of molding of synthetic thermosetting or thermoplastic resin.

Referring particularly to FIGS. 1, 2 and 3 of the drawing, the inner section of the take-up spool comprises a tape mounting cylinder section 10 from one end of which radiates an annular disc 12. The cross sectional thickness of the disc preferably tapers outwardly to reduced dimension at its outer periphery, as best illustrated in FIG. 7. The opposite end of the cylinder section is closed by the wall 14 which supports at the center thereof the hollow hub 16.

An elongated opening 18 in the disc and cylinder section, intermediate the hub 16 and outer periphery of the disc and preferably extending radially thereof, freely receives a resilient actuator member 20 therein. In the embodiment illustrated, this member is formed integrally with the spool section as an elongated resilient flat blade which extends from the outer end of the opening inwardly to point short of the inner end of the opening. The inner section 20' of the blade is offset angularly outward, i.e. toward the closed end 14 of the cylinder section, for purposes explained more fully hereinafter.

A small opening 22 extends through the closed end of the cylinder section adjacent the hub to from an orienting socket, the purpose of which is explained in detail hereinafter.

The outer section of the spool (FIGS. 4, 5 and 6) also includes a tape mounting cylinder section 24 from the closed outer end 26 of which radiates the tapered annular disc 28. A central hub 30 projects inwardly from the closed outer end of the cylinder section, and is stabilized by the reinforcing ribs 32 which extend radially therefrom the inner surface of the hollow cylinder section.

The outer diameter of the hub 30 is substantially the same as the inner diameter of the hub 16 on the inner spool section, to permit concentric mounting of the hubs (FIG. 7). An intermediate shoulder 34 on the hub 30 engages the hub 16 to space the discs 12 and 28 apart slightly greater than the width of a magnetic tape to be supported on the spool. The cylinder sections 10 and 24 also are thus spaced apart, defining an annular groove 36 therebetween. The purpose of this annular groove is described in detail in our copending application previously mentioned.

An orienting pin 38 projects from one of the reinforcing ribs 32 for reception in the orienting socket 22 described hereinbefore, to secure the two spool sections together as an integral unit. A spot of cement is applied between this pin and socket to join the two spool sections together permanently.

The hub 30 of the outer spool section is provided with a non-circular axial opening 40 for mounting the spool assembly on a correspondingly non-circular drive shaft of a tape recorder.

A guide slot 42 is provided in the outer spool section extending inwardly, and prefereably radially, from the outer periphery of the disc 28 and terminates at its inner end adjacent the hub 30, intercepting a portion of the cylinder section 24 and its closed end 26. The elongated resilient blade 20 and the radial slot 42 are arranged in alignment for mutual cooperation, as explained hereinafter, and this orientation is established by the interengaging orienting socket 22 and pin 38.

Spaced laterally from the opposite sides of the slot 42 and projecting outwardly from the closed end of the cylinder scetion are the inner sections 44 of a pair of latch members. The outer end sections 46 of these members are offset to project inwardly toward each other and a spaced distance outwardly of the outer surface of the closed end of the cylinder section.

The take-up spool construction described hereinbefore is adapted for cooperation with a tape connector member of the construction illustrated in FIGS. 6, 7, and 8. This member includes a tape attaching shank 50 projecting inwardly from an enlarged head 52 adapted to be manipulated by contact with a finger. The shank and head are formed as an integral unit, preferably by the molding of a synthetic resin in the manner previously explained.

The shank is formed as a flat blade dimensioned for reception in the guide slot 42 of the outer section of the take-up spool. An elongated opening 54 is provided in the shank for receiving the outer end of a magnetic tape 56 which is looped therethrough and sealed to an adjacent portion of the tape by means of adhesive tape or other suitable means.

The lateral dimension of the head 52 is slightly narrower than the lateral spacing between the upright sections 44 of the latch members, for reception therebetween. In this regard said upright sections have inner facing surfaces which preferably diverge in the direction of the outer periphery of the disc, to assist in guiding the head therethrough.

A central longitudinal porrtion 58 of the head is serrated to provide a positive grip for the finger, and this central portion has a lateral dimension slightly smaller than the lateral spacing between the facing ends of the offset outer sections 46 of the latch members, to permit passage therethrough. The facing ends of the offset outer sections 46 preferably diverge toward the outer periphery of the disc, to assist in guiding the central portion 58 therethrough.

The side portions of the head 52 laterally outward from the central serrated portion 58 each is contoured to provide a forward latch engaging surface 60 which inclines outwardly toward the rearward end of the head and terminates at an inwardly recessed catch socket 62. The rearward end of each socket is defined by the outwardly projecting rearward portion of the head, and the longitudinal dimension of the socket is slightly greater than the corresponding dimension of the offset section 46 of the latch member, to permit reception of the latter therein.

As the tape connector member is threaded through the guide groove of the recorder, as in the aforementioned copending application, the connector shank enters the guide slot 42 and is guided thereby toward the latch members, with the connector head disposed outwardly of the outer section of the spool. The inner end of the shank 50 slides upon the elongated resilient blade 20 which is biased normally outward (FIG. 7) to space the connector head 52 outwardly away from the outer section of the spool.

By pressing inwardly with the finger on the connector head, the resilient blade is deflected inwardly sufficient to allow the inclined surfaces 60 at the lateral sides of the connector head to enter under the offset sections 46 of the latch members. Thus, as the connector is pushed further inward toward the center of the spool the inclined surfaces guides the offset sections 46 into the catch sockets 62. At this point the inner end of the connector shank 50 rests in abutment with the angular cam portion 20' of the resilient blade and the forward end of the connector head is in abutment with the raised projection 64 by which the connector head is positioned substantially parallel to the adjacent surface of the spool.

In the locked position of the connector member, with the resilient actuator blade 20 maintaining the latch members in the catch sockets, the outer edge of the connector shank 50 preferably is positioned substantially in the common plane of the outer surfaces of the aligned tape mounting cylinder sections 10 and 24. Accordingly, upon rotation of the take-up spool the tape 56 is wrapped about the cylinder sections.

When the tape has been unwound from the take-up spool and is desired to release the tape therefrom, inward pressure of the finger is applied to the connector head to rotate the latter counterclockwise (FIG. 8) about the pivot of the forward end of the connector head by the raised projection 64 and against the resistance of the resilient blade 20, to retract the catch sockets 62 from the offset sections 46 of the latch members. Thereupon the connector member may be pushed radially outward through the guide slot 42.

It is to be noted that the various components making up the inner spool section are formed as an integral unit, as are the various components making up the outer spool section. Thus, the takeup spool and connector assembly consists initially of only three parts which represent minimum cost of production and assembly. The assembly functions with precision, speed and facility to insure proper and positive attachment of detachment of a magnetic tape.

It will be apparent to those skilled in the art that various changes may be made in the structural details described hereinbefore without departing from the spirit of this invention and the scope of the appended claims.

Having now described our invention and the manner in which it may be used, what we claim as new and desire to secure by Letters Patent is:

1. A magentic tape take-up spool and connector assembly, comprising
   (a) a tape connector member having catch means thereon, and
   (b) a take-up spool including
      (1) a tape mounting cylinder,
      (2) a pair of discs secured to and radiating from the cylinder and spaced apart logintudinally thereof for confining a tape therebetween,
      (3) one of said discs having a guide slot extending inward from its periphery and adapted to guide the connector member slidably therethrough,
      (4) latch means on the spool arranged to engage the catch means releasably upon movement of the connector member in the slot in the direction parallel to the axis of the cylinder, and
      (5) resilient actuator means on the spool arranged to engage the connector member in the slot and and biased to urge the connector member resiliently in the direction to enterengage the catch and latch means.

2. The assembly of claim 1 wherein the tape connector member includes an enlarged head section adapted to overlie the guide slot and having catch socket means therein, and a shank section adapted to be received slidably in the guide slot, and the latch means comprises a pair of laterally spaced angular latch members mounted on the spool and projecting outwardly from the latter for overlying the head section, the latch members being receivable releasably in the catch socket means.

3. The assembly of claim 2 wherein the resilient actuator means comprises an elongated blade aligned with the guide slot and arranged for slidable engagement by the shank of the connector member.

4. A magnetic tape take-up spool and connector assembly, comprising
   (a) a tape connector member having catch means thereon, and a take-up spool including
      (1) a tape mounting cylinder,
      (2) a pair of discs secured to and radiating from the cylinder and spaced apart longitudinally thereof for confining a tape therebetween,
      (3) one of said discs having a guide slot extending radially inward from its periphery and adapted to guide the connector member slidably therethrough,
      (4) latch means on said one disc arranged to engage the catch means releasably upon movement of the connector member in the slot in the direction parallel to the axis of the cylinder, and
      (5) resilient actuator means on the other of said discs arranged to engage the connector member in the slot and biased to urge the connector member resiliently in the direction to interengage the catch and latch means.

5. A magnetic tape take-up spool and connector assembly, comprising
   (a) a tape connector member having catch means thereon, and
   (b) a take-up spool including
      (1) an inner disc and an outer disc,
      (2) a central tape mounting cylinder section on each disc,
      (3) a central hub on each cylinder section proportioned for interengagement with each other and supporting the discs in longitudinally spaced apart position for receiving a tape therebetween, (4) the outer disc having a guide slot extending inwardly from its periphery and adapted to guide the connector member slidably therethrough, (5) latch means on the outer disc arranged to engage the catch means releasably upon movement of the connector member in the slot in the direction parallel to the axis of the cylinder, and (6) resilent actuator means on the inner disc arranged to engage the connector member in the slot and biased to urge the connector member resiliently in the direction to interengage the catch and latch means.

References Cited by the Examiner
UNITED STATES PATENTS

| | | | |
|---|---|---|---|
| 2,107,530 | 2/38 | Goldeberg | 247—74 |
| 2,450,517 | 10/48 | Koppel | 242—74.1 |
| 2,640,659 | 6/53 | Biko et al. | 242—74 |

MERVIN STEIN, *Primary Examiner.*